United States Patent [19]
Weizman

[11] Patent Number: 5,940,399
[45] Date of Patent: Aug. 17, 1999

[54] METHODS OF COLLISION CONTROL IN CSMA LOCAL AREA NETWORK

[75] Inventor: Moti Weizman, Agoura Hills, Calif.

[73] Assignee: MRV Communications, Inc., Chatsworth, Calif.

[21] Appl. No.: 08/668,568

[22] Filed: Jun. 20, 1996

[51] Int. Cl.$^6$ .................................................. H04J 3/02
[52] U.S. Cl. .......................................... 370/445; 370/458
[58] Field of Search ....................................... 370/445, 446, 370/447, 448, 449, 450, 451, 454, 461, 315, 319, 324, 326, 337, 341, 347, 350, 442, 443, 455, 456–459, 462, 501, 503, 498, 507, 389, 452; 375/211; 455/11.1; 340/825.5, 825.51, 825.52, 825.08, 825.41, 825.541, 825.02, 825.1

[56] References Cited

U.S. PATENT DOCUMENTS

| | | | |
|---|---|---|---|
| 4,347,498 | 8/1982 | Lee et al. ............................. | 340/825.02 |
| 4,998,247 | 3/1991 | Irvine-Halliday et al. ........... | 340/825.5 |
| 5,265,124 | 11/1993 | Staab et al. ............................. | 375/211 |
| 5,287,178 | 2/1994 | Acampora et al. ..................... | 370/474 |
| 5,355,375 | 10/1994 | Christensen ......................... | 340/825.08 |
| 5,430,726 | 7/1995 | Moorwood et al. .................... | 370/428 |
| 5,430,762 | 7/1995 | Vijeh et al. ............................. | 375/211 |
| 5,436,617 | 7/1995 | Adams et al. ........................... | 370/254 |
| 5,467,351 | 11/1995 | Baumert ................................. | 370/406 |
| 5,568,476 | 10/1996 | Sherer et al. ........................... | 370/236 |

*Primary Examiner*—Dang Ton
*Attorney, Agent, or Firm*—Hecker & Harriman

[57] ABSTRACT

The present invention discloses method and apparatus to improve bandwidth utilization and fairness in star topology, collision based networks such as CSMA/CD, IEEE 802.3, ETHERNET. In one embodiment of the invention, when a collision is detected, a multi-port repeater initiates a collision recovery scheme in which it schedules a transmission order for the ports involved in the collision. One end station or port is allowed to transmit at one time. All other ports are sent DEFER signal. In collision control scheme, in response to a collision, a multi-port repeater allows one port or end station to transmit based on a suitable transmission arbitration or scheduling algorithm. The end stations having a frame to transmit send the frame immediately when the channel is free. If the channel is deferred, the end stations send a request-transmission indication to the repeater. The repeater then sends a NON-DEFER signal to the first scheduled station, and DEFER signal to all other end stations to prevent their transmission. In collision recovery and collision control schemes, end stations wait zero time for transmission when allowed by the repeater, thereby providing a deterministic access delay depending on the arbitration algorithm.

4 Claims, 14 Drawing Sheets

METHODS OF COLLISION CONTROL IN CSMA LOCAL AREA NETWORK

BACKGROUND OF THE INVENTION

1. Field of the Invention

The present invention relates to the field of local area networks (LANs), and in particular to collision control for CSMA (Carrier Sense Multiple Access) based local area networks.

2. Background Art

Devices on a data network speak (communicate) with each other by sending messages over a channel. In some networks, only one device is permitted to speak at one time. If more than one device attempts to speak at the same time, there is a "collision" of the messages, and neither of the attempted communications are accomplished. Currently, rules are implemented on networks to determine when each network device will be permitted to speak so that collisions can be avoided. These rules often turn out to be unfair, and also limit the performance of the network.

To understand how these rules work and why they are unfair, it is first useful to understand a data network.

DATA NETWORK DESCRIPTION

A data network consists of two or more stations (a source of messages) connected to a communication channel (such as a wire) under the direction of a control system. A data network, according to the open system interconnection (OSI) model proposed by the International Standards Organization (ISO), is treated as a layered architecture that comprises 1) a physical layer, 2) a data link layer, 3) a network layer, 4) a transport layer, 5) a session layer, 6) a presentation layer, and 7) an application layer. The following is a brief description of each layer.

The physical layer is directed to transmitting raw data bits over a communication channel and provides the actual physical communication medium, such as coaxial cable, twisted pair wiring, and modem(s). The data link layer (DLC) provides the next communication layer. For example, a sending DLC module places control bits at the beginning and end of a data packet, forming a frame. These control bits are used for error control, for retransmission requests for erroneous transmission, and for marking the beginning and ending of frames. Typically, the DLC layer ensures a reliable virtual communication link for each point-to-point link on the network.

The network layer controls the operation of the subnet. Network layers perform routing functions as well as some accounting functions. The transport layer is a source-to-destination, or end-to-end, layer. The transport layer performs flow control between two host machines. The session layer manages dialogue control on the network, and allows users on different machines to establish communication sessions between them. The session layer also performs synchronization for file transfers between machines.

The presentation layer manages data encoding and abstraction so that computers using different data encoding standards (e.g., ASCII, EBCDIC) can still communicate with each other. Also, data compression and encryptions, used to ensure privacy and authentication of data are performed in the presentation layer. The application layer provides the human user interface at each computer and represents the highest level of abstraction in the network. The application layer also performs file transfers between machines.

CSMA/CD NETWORKS

The method of controlling access to the communication channel is known as an access protocol. A popular access protocol is known as the IEEE 802.3 standard. The IEEE 802.3 standard permits multiple stations to access the channel at the same time. There is no need for a station to request control of the channel before sending a message. Instead, the station senses the channel to see if it is available (known as "carrier sense") and if so, begins sending a message. If two stations believe the channel is available and both start sending a message, there will be a collision of the messages. When a station detects an incoming message while it is sending its own message, that station is said to have detected a collision. Because of its method of operation, the IEEE 802.3 standard is known as a carrier-sense multiple-access with collision detection (CSMA/CD) medium access control (MAC) standard. This standard is defined in ANSI/IEEE 802.3. We will refer to the IEEE 802.3 and similar protocol networks as "CSMA/CD protocol networks."

FIG. 1 shows a typical CSMA/CD protocol network with a repeater. A repeater is designed to amplify incoming signals (to overcome signal attenuation) and retransmit them. The repeater shown in FIG. 1 is a multi-port repeater coupled to a plurality of end stations. The repeater of FIG. 1 receives a transmission from one end station and relays the transmission to all other end stations.

In data networks, messages are usually broken into shorter strings called packets. Packets are further padded with control bits at the beginning and/or end to provide information such as source address, destination address, and packet length. Packets with control bits are called frames. Time is often divided into discrete intervals called slots. Transmission synchronization is not required and a frame transmission can start at any time, at which a slot begins. A slot may contain one or more frames. The length of the slot is referred to as the slot time.

The slot time is the scheduling quantum for retransmission and an upper bound in the length of a frame fragment generated by a collision. The slot time also represents an upper bound on the acquisition time of the transmission channel.

If all end stations are well-behaved and simultaneous data transmissions by more than one end station to the repeater do not occur, the multi-port repeater such as shown in FIG. 1 would be able to relay data frames among end stations successfully without losing any packets. However, in the typical CSMA/CD protocol it is possible for end stations to attempt to transmit packets to the multi-port repeater at the same time. When simultaneous transmissions are attempted by more than one end station, the network experiences a "collision." As a result, all transmissions are lost or dropped by the repeater. Thus, the end stations with the frames to be retransmitted (known as "backlogged" end stations) must retransmit the dropped packets at some later time if reliable communication is desired.

COLLISION MANAGEMENT

If each backlogged station were to simply retransmit in the next slot following a collision, then another collision would surely occur. Thus, the IEEE 802.3 standard uses a controlled randomization process called "truncated exponential binary backoff" for retransmission. In this scheme, after a collision, a backlogged station delays some amount of time before attempting to retransmit the data packet or frame. The delay is computed to be an integer multiple of a slot time.

The retransmission delay dynamically adapts to the number of retries for a station, and the randomization delay interval grows exponentially as consecutive collisions occur.

The wait is in a range of slot times running up to $2^{n-1} \times$Slot Time, where n is the number of consecutive collisions. What this means is that for a first collision, the backlogged station chooses between retransmitting immediately or waiting one slot time before attempting to retransmit. If the backlogged station has a second collision (without a successful transmission in-between) the station waits an amount of time from a larger range, e.g. zero wait, one slot time, or two slot times. For a third collision, a backlogged station may wait from zero to four slot times. The maximum amount of delay allowed in this system is $2^{10} \times$Slot Time. The maximum allowed number of retransmission trials is typically set at sixteen. That is, after the sixteenth failure, the event is reported as an error.

DISADVANTAGES OF THE PRIOR ART SYSTEMS

The "truncated exponential binary backoff" strategy is unstable, i.e., it cannot guarantee an upper bound on retransmission delay for every frame arrival rate greater than zero. In the worst case, a station might have to wait indefinitely to retransmit its frames. This variable delay can pose a serious problem for real time applications (such as video transmission) which require a deterministic or fairly constant transmission delay for data frames.

Another disadvantage with the prior art CSMA/CD systems is that fairness is not guaranteed because some stations may have to wait a longer period of time than other stations to retransmit their frames. This can be readily understood by considering two stations, A and B, that are both ready for transmission at the same time. As the frames from stations A and B collide, both stations back off according to the "truncated exponential binary backoff" algorithm and wait for their turns to retransmit.

Suppose station A gets its turn first with station B waiting for a longer retransmission delay. By the time station B has completed its waiting period, and is readying itself to make a second attempt for transmission, station A may have already finished its first transmission. That means that station A may be ready to transmit another frame at the same time station B attempts to retransmit its first frame. If station A again acquires the channel for its second transmission, station B will have to give up the channel and back off yet another time. This time, station B's waiting period may be twice as long as the first time. If another collision occurs between stations A and B, it will be the first collision for station A after its second transmission and the third consecutive collision for station B. That means that station A will wait either zero or one slot time, while station B will wait zero, one, two, three or four slot times, making it more likely that station A will win again. Each subsequent collision between stations A and B makes it more likely that station A will continue to win, because the range of station B's possible wait states keeps increasing.

Another disadvantage of current schemes is a limitation on network diameter. Network diameter refers to the maximum physical distance permissible between stations on a network (e.g., stations may be required to be within 10 meters of each other to maintain a particular transmission speed. The network diameter is limited, in part, by the slot time and the propagation delay.

According to current IEEE 802.3 standards, the slot time is calculated to be larger than the sum of the physical layer round trip propagation time between the two farthest nodes on a network. This guarantees that a sending station will be able to determine if there was a collision in transmission within a slot time.

According to the IEEE 802.3 standard, the minimum frame size is 64 bytes. This translates to slot times of 64 $\mu$sec for a 10 Mbit data network, 6.4 $\mu$sec for a 100 Mbit data network, and 640 nanosec for 1 Gbit data network. Considering the signal propagation speed of about 5 $\mu$sec/KM, a 1 Gbit/sec data rate translates to a maximum network diameter on the order of 10 meters, which significantly limits the size of high speed data networks.

One prior art attempt to increase network diameter is known as an Aloha scheme. In a slotted Aloha scheme proposed by Roberts in 1972, time is divided up into discrete intervals, where each interval corresponds to one frame. Using this scheme, a station is not permitted to send frames at will. Instead, each station is required to wait for the next slot for transmission. Synchronization is achieved by a master station or a central hub that emits a pip at the start of each slot.

Further, in the prior art CSMA/CD systems, the communication bandwidth of the system reaches a peak that is below the optimal point Because of this, the system utilization does not provide sufficient efficiency and may drop as the system grows in size.

INDETERMINATE VS. DETERMINISTIC SCHEME

CSMA/CD schemes are known as "indeterminate" transmission schemes because the order of transmission of stations is unknown and asynchronous. Deterministic schemes schedule the stations in some order. In some cases, it would be advantageous to have a CMSA/CD protocol network behave in a deterministic fashion.

In U.S. Pat. No. 5,355,375, Christensen discusses a method for combining a deterministic contention algorithm with the indeterminate contention algorithm of the CSMA/CD protocol to provide deterministic access. Christensen uses media control logic that selectively generates a pseudo carrier control signal for each station to inhibit transmissions by that station. The media control logic of Christensen also determines which port will be allowed to contend for access to the common bus, and for how long. When polling is used with CSMA/CD, each station is given a predefined time slot in which to transmit.

Christensen's method, however, retains major facilities of the existing IEEE 802.3 standards, including some of its disadvantages. For example, Christensen's method provides deterministic access delay by sequentially allowing each station to transmit. However, each station does not always need to transmit a message. Each time a non-transmitting station is given control of the communication channel, that time slot is essentially wasted. This adversely affects the bandwidth utilization of the network whenever a majority of stations are silent while a small group of stations have a high transmission load. Since the Christensen method is deterministic, it is not flexible enough to quickly adjust to varying network conditions. Also, there is an additional delay associated with the request acknowledge protocol used by Christensen even when a large group of stations wants to transmit.

In another prior art approach, U.S. Pat. No. 5,467,351 to Robert Baumert discusses an extendible, round robin, local area hub station network. This approach requires at least two round robin hub stations coupled so as to form a ring-shaped signal path. One of the two hub stations is a master hub station that can control transfer of round robin polling over the hub station network between the two hub stations. This system anticipates the growth in network size, and attempts to provide an extendible control center to accommodate new end stations, by adding more control hub stations that perform round robin polling instead of CSMA/CD.

In yet another prior art approach, attempts were made to change the random number generation algorithm. These approaches, however, still suffer from variable and indeterminate transmission delays.

Repeaters with memory buffers (such as FIFO memory buffers) were also proposed to provide temporary storage for packets in "collision" and to save those packets that would otherwise be dropped. In practice, however, in multiaccess channels with a large number of nodes and a relatively small packet arrival rate, the fraction of backlogged nodes is small, and the number of new arrivals at backlogged nodes are almost negligible. Thus, the repeater performance without buffering is relatively close to that with buffering. Also, when the frame arrival rate exceeds the frame process rate, the buffer will eventually fill up no matter what the size of the buffer is, at which point frame transmission has to stop. Thus, buffering only offers a limited solution.

Also, the prior art CSMA/CD systems do not permit priority indication for frames and all frames are treated as if they are of equal importance or priority. This can delay frames that require faster service or processing than other normal frames. For example, real time video frames have tighter delay requirements and the requirements may not be met with the conventional system if collisions frequently due to severe channel contention in the network.

SUMMARY OF THE INVENTION

The present invention discloses method and apparatus to improve bandwidth utilization and fairness in star topology, collision based networks (CSMA/CD, IEEE 802.3, ETHERNET, etc.) by applying smart collision recovery techniques. The invention provides deterministic multi-access delay as well as shorter slot times for star topology networks that comprise a multi-port repeater connected to a plurality of end stations.

In one embodiment of the invention, when a collision is detected, a multi-port repeater initiates a collision recovery scheme in which it tags the ports or end stations involved in the collision as "requesting-to-transmit" and schedules the retransmission order. Any suitable arbitration or scheduling algorithm can be used to improve fairness in the transmission order. Round robin or FIFO policies can be used as an arbitration algorithm. One end station is allowed to transmit at one time. All other end stations are sent DEFER signals to prevent them from transmitting frames. After all end stations tagged as "requesting-to-transmit" have been given a chance to transmit, the repeater reverts to the default state where a plurality of ports or end stations are permitted to transmit and contend for the communication channel.

In the collision control scheme of the invention, in response to a collision or a request-to-transmit indication, a multi-port repeater allows end stations to transmit based on a suitable transmission arbitration or scheduling algorithm. The deferred end stations having a frame to transmit send a request-transmission (REQ) indication, to the repeater. Thus, usually after a collision or after a transmission that deferred other transmissions, the repeater receives REQ signals. The repeater then switches to a synchronous mode in which it sends a NON-DEFER signal to the first scheduled station, and a DEFER signal to all other end stations to prevent their transmission. After each successful reception of a frame, the repeater reschedules the transmission order based upon REQs received from end stations. When the repeater does not receive a REQ signal from any of the ports, the repeater sends a NON-DEFER signal to all the ports, thus reverting to the default state where a plurality of end stations are permitted to transmit and contend for the channel.

In both the collision recovery and collision control schemes, end stations do not use a binary exponential backoff algorithm. Instead, end stations wait zero time for transmission when allowed to transmit by the repeater. Thus, both the collision recovery and collision control schemes can improve fairness in channel acquisition for end stations and also provide deterministic channel access delay. Also, in both the collision recovery and collision control schemes, priority information can be incorporated in the frame format or in the REQ indication such that higher priority frames are given preferred placement in the transmission schedule. This feature allows some real time frames to be transmitted with shorter delay.

In the efficient collision scheme of the invention, transmission slot time is reduced to approximately half of the current Ethernet standards by considering the end-to-end delay instead of round trip delay. In this scheme, the first frame received is considered as a good frame and broadcast to all other ports while all other frames received during the reception of the good frame are discarded. End stations that receive incoming transmission from other stations during their own transmission period learn that their own transmissions were not successfully received. Thus, the received carrier is used to back off a transmission.

Fairness in channel acquisition can be improved by using a suitable synchronization scheme in conjunction with the efficient collision scheme. For example, the efficient collision scheme can be combined with the collision control scheme. Further, since the efficient collision scheme reduces the effective slot time by approximately half, the network diameter can be increased accordingly, allowing network expansion and user base growth.

DETAILED DESCRIPTION OF THE PRESENT INVENTION

Figure 1:
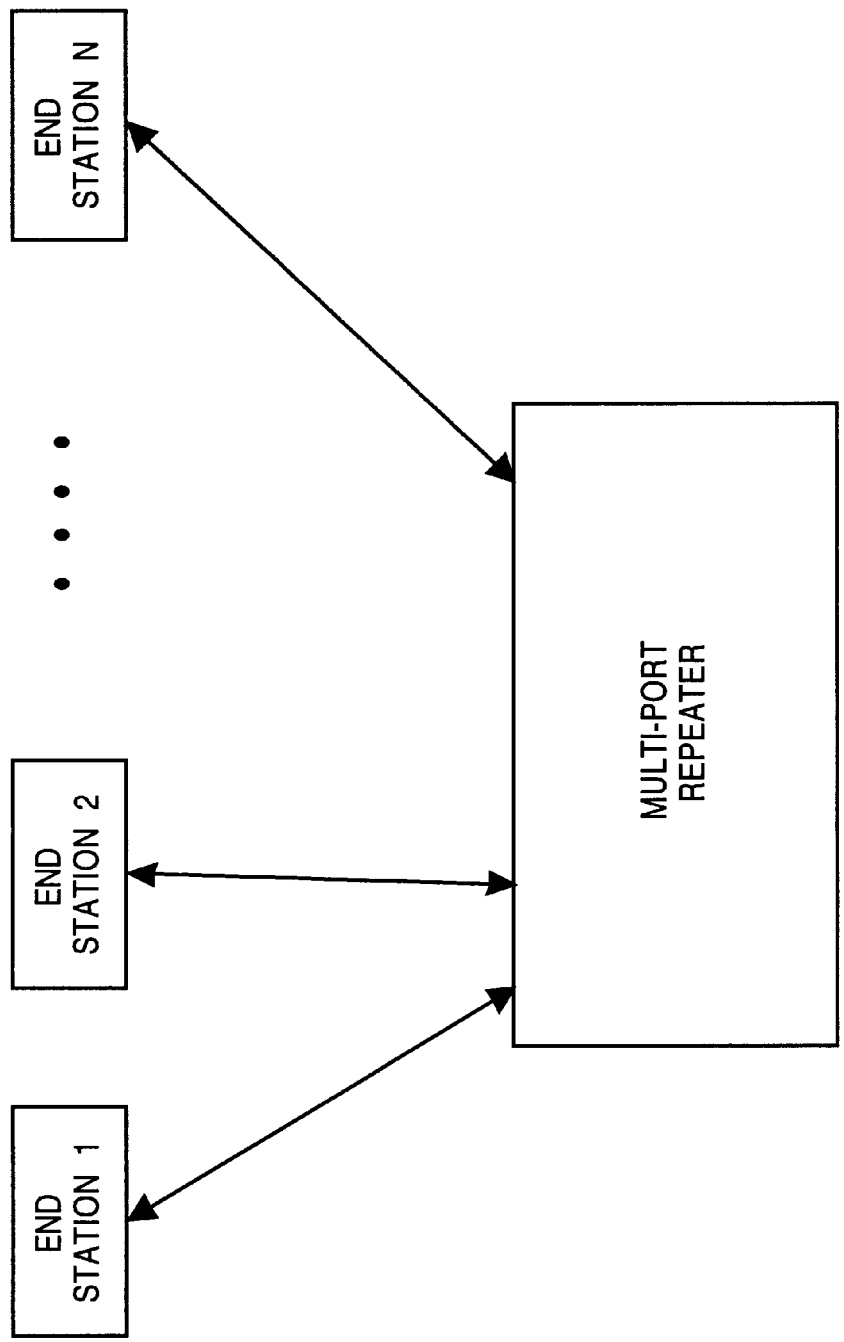
FIG. 1 shows a typical CSMA/CD protocol network with a repeater.

A method of collision recovery for CSMA/CD based networks is described. In the following description, numerous specific details are set forth to provide a more thorough understanding of the present invention. It will be apparent, however, to one skilled in the art, that the present invention may be practiced without these specific details. In other instances, well known features have not been described in detail so as not to obscure the present invention.

Methods and apparatus are provided to improve bandwidth utilization and fairness in star topology, collision based networks, such as, for example networks using CSMA/CD, IEEE 802.3, or ETHERNET.

CSMA/CD schemes, as noted above, are indeterminite schemes. Such schemes achieve efficiency by having only those ports that want to communicate involved in data channel contention. There is no control mechanism that polls each port to determine its need to transmit. Instead, a port transmits when it needs to transmit. Such a scheme can work for low to medium traffic, but in high traffic situations, collisions occur. The CSMA/CD scheme for collision recovery leads to the disadvantages noted previously.

It would be desirable to be able to switch the system to a deterministic system when there are collisions. Prior art attempts to do so have required that all ports be polled or be given an assigned transmit slot. Such schemes needlessly involve ports that do not need to transmit, wasting bandwidth and leading to inefficiencies.

The present invention provides a method of switching to a deterministic mode that only involves ports that want to transmit. This is accomplished by having the repeater identify the ports involved in a collision. Although there may be other ports that also want to transmit, any ports involved in a collision are known to want to transmit. These ports are referred to as "backlogged" ports. The repeater sends out a signal to all ports not involved in the collision that the data channel is not available. Of the backlogged ports involved in the collision, the repeater uses a method of determining which of those backlogged ports should go first, sends a data channel available signal to that port, and holds the remaining backlogged port or ports involved in the collision from transmitting. After the first port selected has transmitted, the remaining backlogged ports are permitted to transmit one by one until all the backlogged ports involved in the collision have transmitted. The repeater then returns the system to indeterminite mode following existing CSMA/CD protocols. The scheme of the present invention that accomplishes this is referred to here as a deterministic collision recovery scheme and is described further below.

DETERMINISTIC COLLISION RECOVERY

In one embodiment of the collision recovery scheme according to the invention, a multi-port repeater is connected to all end stations. This repeater contains logic to identify a collision, and to ensure that end stations that need to retransmit as a result of a collision are informed that their transmissions were unsuccessful.

Operation of the present invention begins in an indeterminite mode similar to traditional CSMA/CD schemes. A station that wants to communicate senses the carrier and, if available, sends a message. If that station does not receive another message while it is transmitting, it assumes that there was no collision and that its message was successfully sent. If the transmitting station begins to receive another message while transmitting, it assumes a collision. The system then switches to deterministic mode.

When a collision occurs the repeater identifies the stations involved in the collision and switches over to the deterministic collision recovery mode. The repeater first inhibits all ports from transmitting with a "defer" signal and, after acting as an arbiter and determining which of the ports involved in the collision will transmit first, sends a "non-defer" signal to that port. The repeater identifies all ports involved in the collision and tags them internally as "requesting-to-transmit" ports. When the transmission from the non-deferred port is received by the repeater, it is broadcast to all other ports. Then the repeater sends a defer signal to the previously non-deferred port and a non-defer indication to the next scheduled port or end station to allow its transmission. Meanwhile, all other ports remain inhibited from transmitting. This process continues until all ports scheduled to transmit by the arbiter have completed transmission. When the last backlogged port completes its scheduled transmission the multi-port-repeater switches back to the default state where more than one port may obtain permission to transmit and contend for the channel.

In this embodiment, end-stations contain logic to transmit frames when the channel is not-deferred, and to determine if a transmitted frame needs to be retransmitted due to a collision event. If retransmission is needed, an end station waits for a non-defer indication on the channel from the repeater and retransmits the frame after a pre-defined Inter-Frame-Gap. The Inter-Frame-Gap is a time delay between transmitted frames to permit inter-frame recovery for other CSMA/CD sublayers and for the physical medium. If no retransmit is needed, the end station waits for a non-defer indication on the channel and transmits the next frame after an Inter-Frame-Gap.

Figure 14:
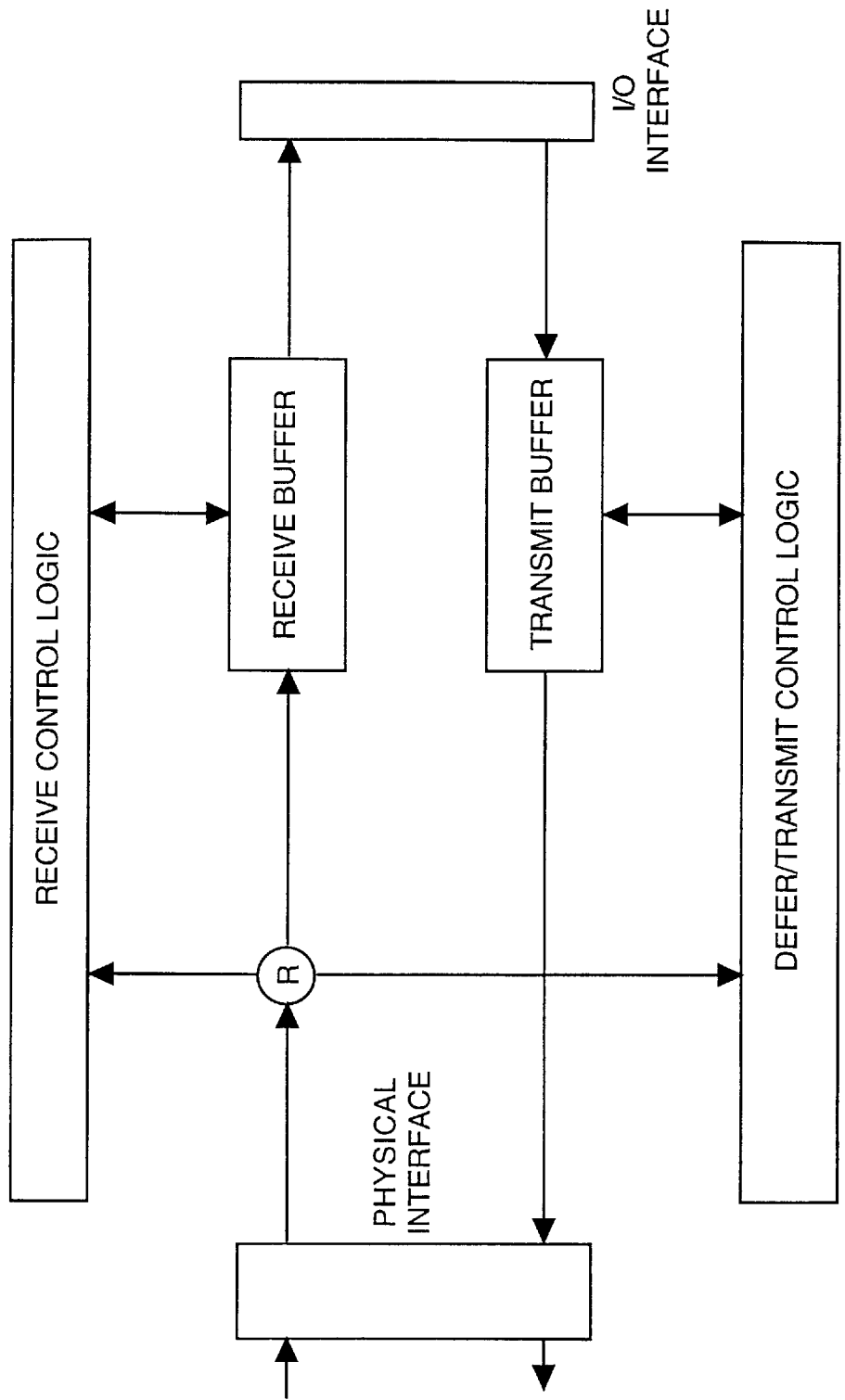
FIG. 14 is a block diagram of an end station of one embodiment of the invention.

FIG. 14 is a block diagram of an end station of one embodiment of the invention. Referring to FIG. 14, incoming data transmission is received through the PHYSICAL INTERFACE block and routed by routing device R to the RECEIVE CONTROL, RECEIVE BUFFER and DEFER/TRANSMIT CONTROL blocks. Outgoing frames are taken from the TRANSMIT BUFFER and transmitted through the PHYSICAL INTERFACE. The RECEIVE BUFFER and TRANSMIT BUFFER are coupled to an I/O interface of a host computer. The RECEIVE CONTROL and DEFER/TRANSMIT CONTROL blocks contain logic to perform the operations described above.

The method of stopping ports from transmitting is referred to here as a transmission defer method. Transmission defer methods can be chosen independent of the collision recovery method described above. The following are a few examples of transmission defer methods that can be used in conjunction with the invention. A dummy transmission frame (JAM) can be sent to a port, signaling the port to stop transmitting. A predefined carrier extension symbol can be used. Two idle symbols where one is Defer-idle and the second is Non-defer-idle can be used. A single symbol that signals "Transmit-now" can also be sent to end-stations.

Figure 2:
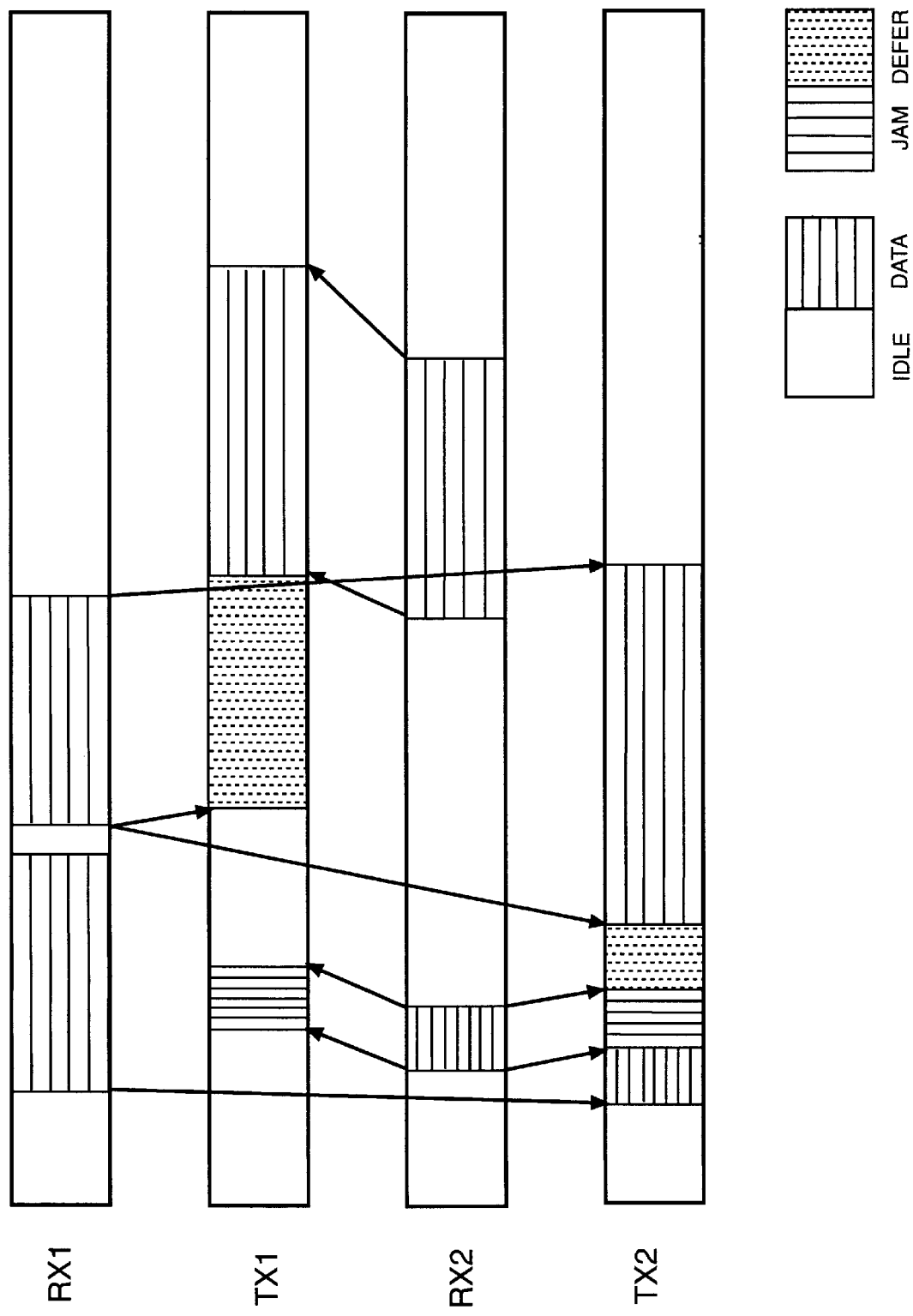
FIG. 2 illustrates an example of a collision recovery scheme using idle and defer symbols.

FIG. 2 illustrates an example of collision recovery scheme using two idle symbols. In FIG. 2, the repeater receives incoming data from station 1. The repeater then starts to broadcast the received data to stations, 2, 3, . . . , N, where N is the number of end stations connected to the multi-port repeater. However, station 2, not knowing that station 1 already has started transmission, transmits its own frames to the repeater. The repeater then receives incoming data through port 2 and thus detects the collision of data from ports 1 and 2.

Referring to FIG. 2, upon detecting the collision, the repeater sends JAM frames to stations 1 and 2 to signal them to stop transmissions followed by a DEFER signal to station 2 to inhibit it from further transmission. After receiving the JAM signal and waiting for an Inter-Frame-Gap, station 1 retransmits its data, which is received successfully and broadcast by the repeater. The repeater also sends a DEFER frame to station 1 to prevent it from further transmissions. As station 2 is the next scheduled station for transmission, station 2 successfully acquires the channel and completes its transmission, which is relayed to the other stations by the repeater.

Figure 3:
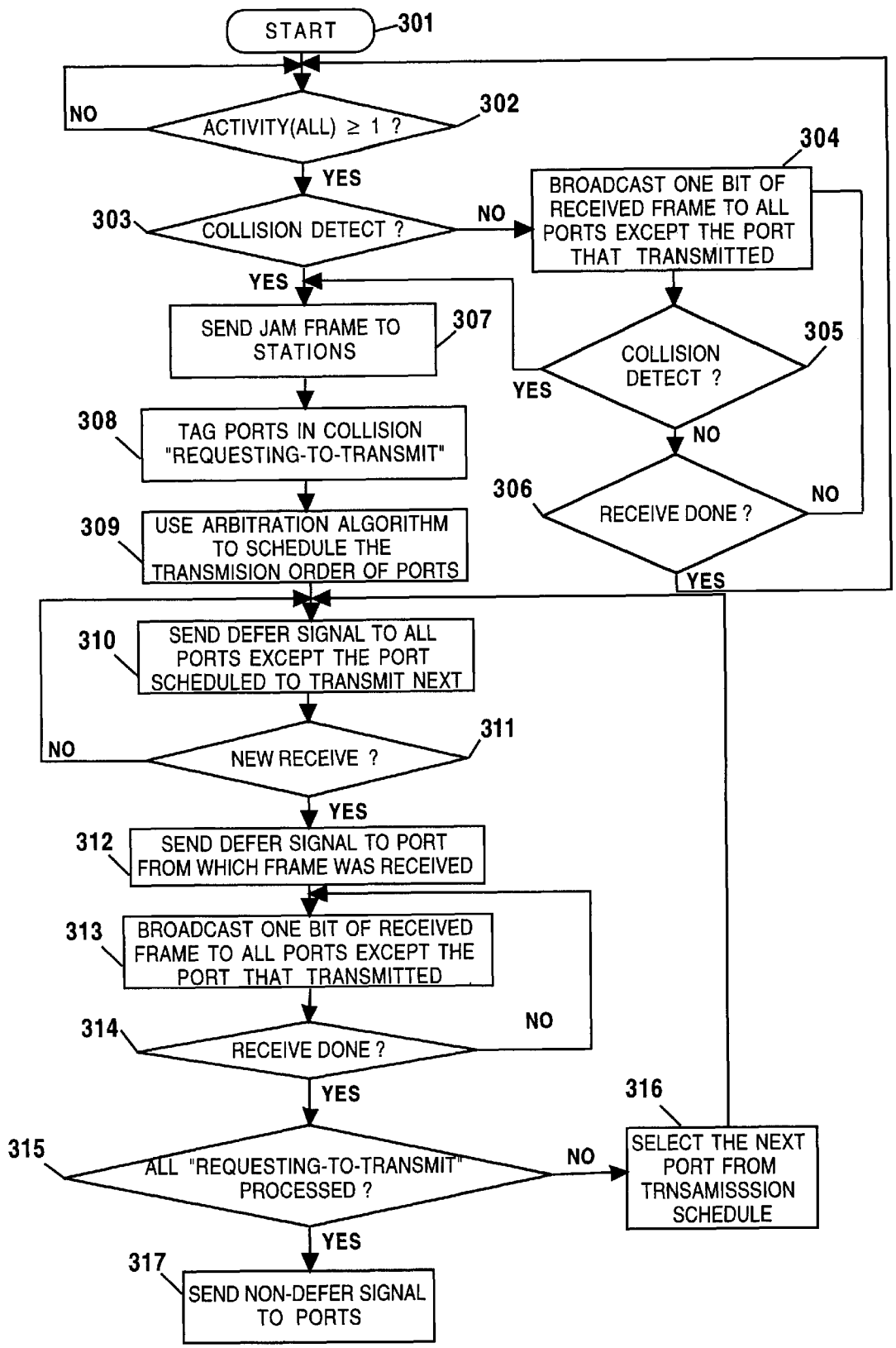
FIG. 3 is a flowchart describing a multi-port repeater using a collision recovery scheme with two idle symbols.

FIG. 3 is a flowchart describing a multi-port repeater using a collision recovery scheme with two idle symbols. In step 302, port status is checked to see if there is any activity. If so, at step 303, a collision detection is performed to check if there are multiple incoming transmissions. If not, one bit of the sole incoming transmission is relayed to all other ports at step 304, after which ports are checked again to see if there is a collision at step 305. This allows monitoring of channel status to detect a collision while the repeater is receiving and broadcasting a frame. If there is no collision, at step 306 a determination is made as to whether the whole frame has been received. If yes, the repeater proceeds to step 302. If the whole frame was not yet received, the repeater goes back to step 304.

If a collision is detected at step 303 or 305, the repeater sends a JAM frame to all end stations at step 307, and internally tags the ports whose transmissions caused the collision as requesting-to-transmit at step 308. The repeater then schedules a transmission order for ports or end stations at step 309 based on an arbitration or a scheduling algorithm.

At step 310, the repeater sends a DEFER signal to all ports except the port scheduled to transmit next. If a new frame is received at step 311, the repeater sends a DEFER signal to the port through which the frame was received at step 312. This prevents any end station or stations coupled to the port from transmitting frames after the currently received frame. If a new frame is not received, the repeater goes to step 310. At step 313, the repeater broadcasts one bit of the received frame to all ports except the origin of the received frame. If, at step 314, the whole frame is received and broadcast, the repeater examines the transmission schedule at step 315 to see if all tagged ports have been processed. If so, the repeater sends a NON-DEFER signal to all ports at step 317 and reverts to the default mode. If not, the next station or port is selected from the transmission schedule at step 316 and the process proceeds to step 310.

It will be appreciated by one skilled in the art that the flowchart shown in FIG. 3 represents one particular embodiment of the invention and additions or modifications are possible to the repeater routine without departing from the scope of the invention.

As can be seen from FIGS. 2 and 3, fairness is improved in the invention by scheduling all stations that are involved in a collision so that no station is permitted to transmit more than once until each of all backlogged stations has had its turn to transmit.

This improved fairness in transmission schedule and channel acquisition also means bounded deterministic data transmission delays since, according to the current CSMA/CD protocols, a frame has a maximum allowed length, for example, 1518 bytes. In other words, a worst case transmission delay for N stations with a central repeater can be estimated in the invention. Suppose, for N number of stations in the system, N-1 stations start transmission so that the repeater detects N-1 transmissions colliding. The N-th station that was not involved in the collision has a frame to transmit immediately after the collision. In the second round of transmission, the repeater detects a collision involving all N transmissions and schedules them in a round robin fashion, which places station N in the last spot of a retransmission order. Then the last transmission will occur for station N after $2\times(N-1)\times\{(\text{time to transmit a maximum size frame})+(\text{Inter-Frame-Gap})\}$.

Further, in this particular embodiment of a collision recovery scheme, end stations are no longer required to select wait times from random intervals based on a binary exponential backoff scheme. Instead, end stations can retry after zero delay if there are no defer signals for them, making it possible to determine the worst case transmission delay depending upon the selected arbitration or scheduling algorithm.

Any arbitration or scheduling algorithm can be used in conjunction with the invention if it can generate an order of transmission for backlogged ports. The transmission schedule may or may not include the ports involved in the collision. However, a deterministic access algorithm can have bandwidth utilization advantages. To improve fairness, the algorithm may consider a past bandwidth utilization quantification. An example of a simple deterministic scheduling algorithm is a round robin policy in which the collided ports are scheduled to retransmit in the same order as their port numbers. The example shown in FIG. 2 uses a round robin policy in which station 1 is given permission before station 2.

Since under some unpredicted scenarios a port that has been granted permission to transmit may decide or be forced not to transmit for some reason, a suitable protection mechanism is provided in the invention that limits the time allowed for a port to transmit to a prespecified maximum value. Thus, if after that prespecified maximum value a station has not started or completed transmission, a time out occurs for the station and the station loses its turn.

In the collision recovery scheme described above, since transmission after a collision is under full control of a multi-port repeater, the worst case scenario is when there are always two stations that want to transmit short frames and they are never synchronized. Each transmission would suffer a collision. Still, the network will be fair (50% to each station) and can have more than 50% utilization depending on other parameters discussed above. Thus the collision recovery scheme discussed above overcomes the prior art disadvantages, provides deterministic access delay, and improves fairness in channel acquisition.

Figure 4:
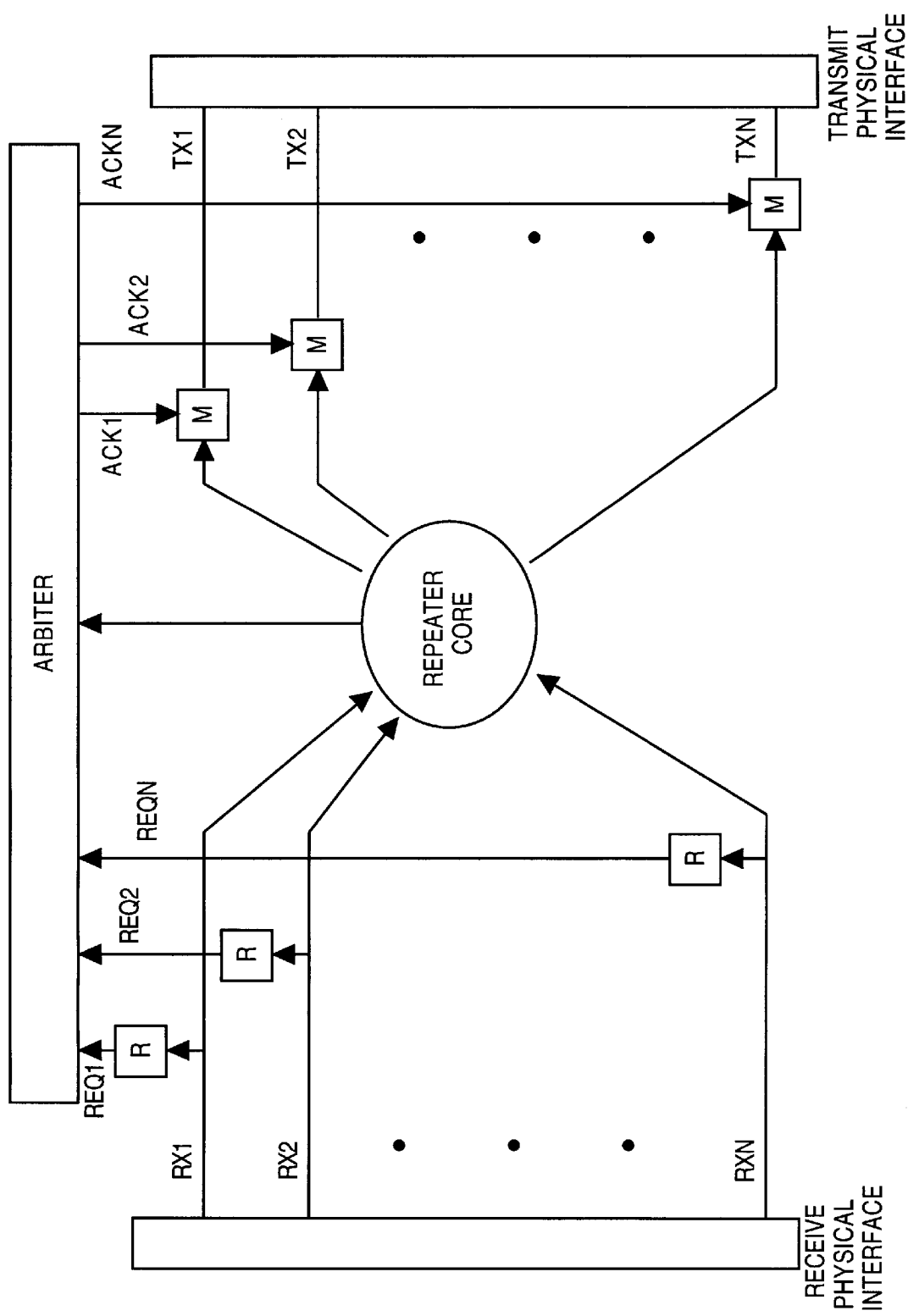
FIG. 4 is a block diagram of a multi-port repeater of one embodiment of the invention.

FIG. 4 is a block diagram of a multi-port repeater of one embodiment of the invention. In FIG. 4, block R generates a receive indication for the ARBITER block. Block M functions as follows: If the ACK signal from the ARBITER is on, Block M sends exactly what the repeater core is sending. If the ACK signal from the ARBITER is off, Block M replaces only the non-defer-idle symbols from the repeater with defer indication to the end-station and copies all other symbols and data as is. The REPEATER CORE is also coupled to the ARBITER to provide additional information to assist in scheduling decisions. A RECEIVE physical interface and a TRANSMIT physical interface provide the physical layer level interface between the end stations and the repeater.

The ARBITER implements a suitable station transmission scheduling algorithm as discussed above. The Repeater Core does not necessarily need to know what the arbiter is doing, however the Arbiter should not violate the rules of the Repeater Core algorithm. Thus, it will be appreciated by one skilled in the art that the collision recovery method discussed above can be combined with any suitable algorithm of a CSMA/CD repeater, with the cooperation of end-stations to comply with defer signals. If the collision recovery scheme is used in conjunction with the current CSMA/CD Ethernet, however, there might be some network performance degradation due to the random nature of the standard retransmission backoff delay, i.e, stations may have to backoff unnecessarily for retransmission.

Figure 5:
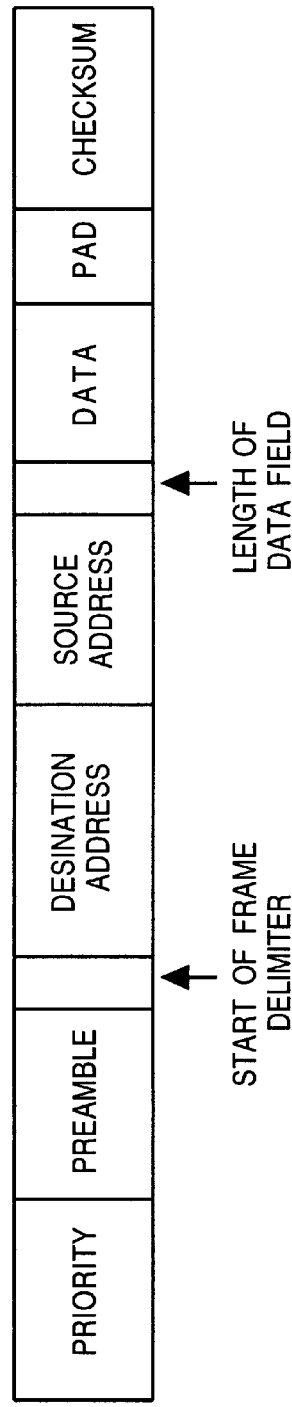
FIG. 5 shows an example of a frame format that can be used in conjunction with the invention.

Further, a priority scheme can be incorporated in the invention. For example, stations can include transmission priority information in frame headers and the arbiter in the multi-port repeater can be modified to honor or recognize the priority information. Thus, when there is a collision, frame transmission priority of the frames involved in the collision can be examined by the arbiter and the station or port with the higher priority frame to transmit can be given permission to transmit first. This feature can significantly improve network performance for real time packets. Some video or live conference packets or frames have tight delay requirements and these requirements can be met effectively by assigning a high priority to these packets or frames. FIG. 5 shows an example of a frame format that can be used in conjunction with the invention.

The frame shown in FIG. 5 contains priority information, a preamble and two addresses, one for the destination and one for the source. The length field tells how many bytes are present in the data field. The pad field is used to fill out the frame to the minimum size. The final field is the Checksum. If some data bits are erroneously received, the checksum will almost certainly be wrong, and the error will be detected. Any suitable error detection or correction scheme can be used for checksum.

Using padding in a frame also allows the slot time to be increased by increasing the minimum frame size. In most collision based networks, the slot time is an important system parameter, since it affects the maximum network diameter as well as the minimum frame size. The invention can be used in conjunction with any methods to improve the slot time, such as synchronized CSMA/CD (slotted aloha).

In an alternate embodiment of the invention, when in collision recovery mode, the repeater may send information to an end station in addition to a NON-DEFER signal to indicate that the network is in a synchronized mode and that it is not necessary to bring the frame size up to the minimum size using padding or carrier extension. This improves the bandwidth utilization for larger network diameters.

A method that defines a slot time to be longer than the minimum frame size may have the following benefits if used with the invention: A transmission event that may suffer a collision has to be extended to last the entire slot-time, if the repeater is responsible to extend each event to the entire slot time. Then if a collision occurs and retransmission is synchronized, each transmission can be as short as the minimum frame size. Another benefit is to be able to have a dynamic slot time. Since the repeater has some synchronized transmissions after a collision it can measure the maximum delay from the sending of the non-defer signal to the time a frame is received by all ports. This data may be used to calculate the shortest slot-time possible in a specific network.

In alternate embodiments of the invention, other collision resolving algorithms may be combined with the collision recovery method described above when more than one port is allowed to transmit. For example, after a collision is detected, the repeater may send non-defer signals to more than one ports and allow them to resolve the collision among themselves. Randomly generated numbers can be used to select gap times between frames for example. In still another embodiment of the invention, a suitable arbitration method can be used among ready-to-transmit ports when some ports are allowed to ignore the defer signal.

COLLISION CONTROL SCHEME

The above scheme switches a CSMA/CD system into a deterministic mode when there is a collision and arbitrates between the backlogged ports involved in the collision. Other ports not involved in the collision are prevented from transmitting or participating in the arbitration until those ports involved in the collision have transmitted. An alternative embodiment, referred to here as a collision control method, provides a scheme which permits ports not involved in the collision to indicate a need to transmit and thereby participate in the arbitration even though the port were not involved in the original collision. This reduces the number of collisions and is thus known as a collision control method.

The collision control method uses a control signal, "request-to-transmit", to improve bandwidth utilization and transmission fairness in star topology, collision based networks (CSMA, CSMA/CD, IEEE 802.3 ETHERNET etc.). After a collision, at least the end stations involved in the collision send a request-to-transmit indication to the multi-port repeater. The repeater applies any suitable arbitration algorithm such as a round robin or FIFO algorithm and synchronizes transmission by sending a non-defer indication to the next scheduled port. The repeater may send a non-defer indication to more than one station. During the arbitration, a port not involved in the collision may send a request to transmit signal to the repeater. The repeater monitors the ports and includes each requesting port in the arbitration. When there are no remaining ports requesting to transmit, the multi-port-repeater switches back to a state where more than one port is given permission to transmit and allowed to contend for the channel.

The multi-port repeater architecture such as shown in FIG. 4 can be used to implement this embodiment of the invention. Also, the end station architecture such as shown in FIG. 14 can be used to implement this embodiment. In this embodiment, RECEIVE and DEFER/TRANSMIT CONTROL blocks of end stations contain logic to transmit frames when the channel is not-deferred, to determine if a frame needs to be retransmitted due to a collision event, and to send a REQ signal if the channel is deferred.

In this particular embodiment, a multi-port repeater contains logic to identify a collision and to provide the ports that need to retransmit with the information that their transmission was not successful. The REPEATER CORE is coupled to the ARBITER to provide additional information to assist in scheduling decisions. Block R provides a request-to-transmit and receive indication to the ARBITER block. Block M functions as follows: If the ACK signal from the ARBITER is on, Block M sends exactly what the repeater is sending, if the ACK signal from the ARBITER is off, Block M sends only the non-defer-idle symbols from the repeater with defer indications to the end-station and copies all other symbols and data as is.

The ARBITER implements any suitable arbitration or scheduling algorithm as discussed above. A Round robin or FIFO scheduling algorithms are examples of deterministic access algorithms. The REPEATER CORE block does not necessarily need to know what the ARBITER is doing, however the ARBITER should not violate the rules of the multi-port repeater algorithm.

Figure 9:
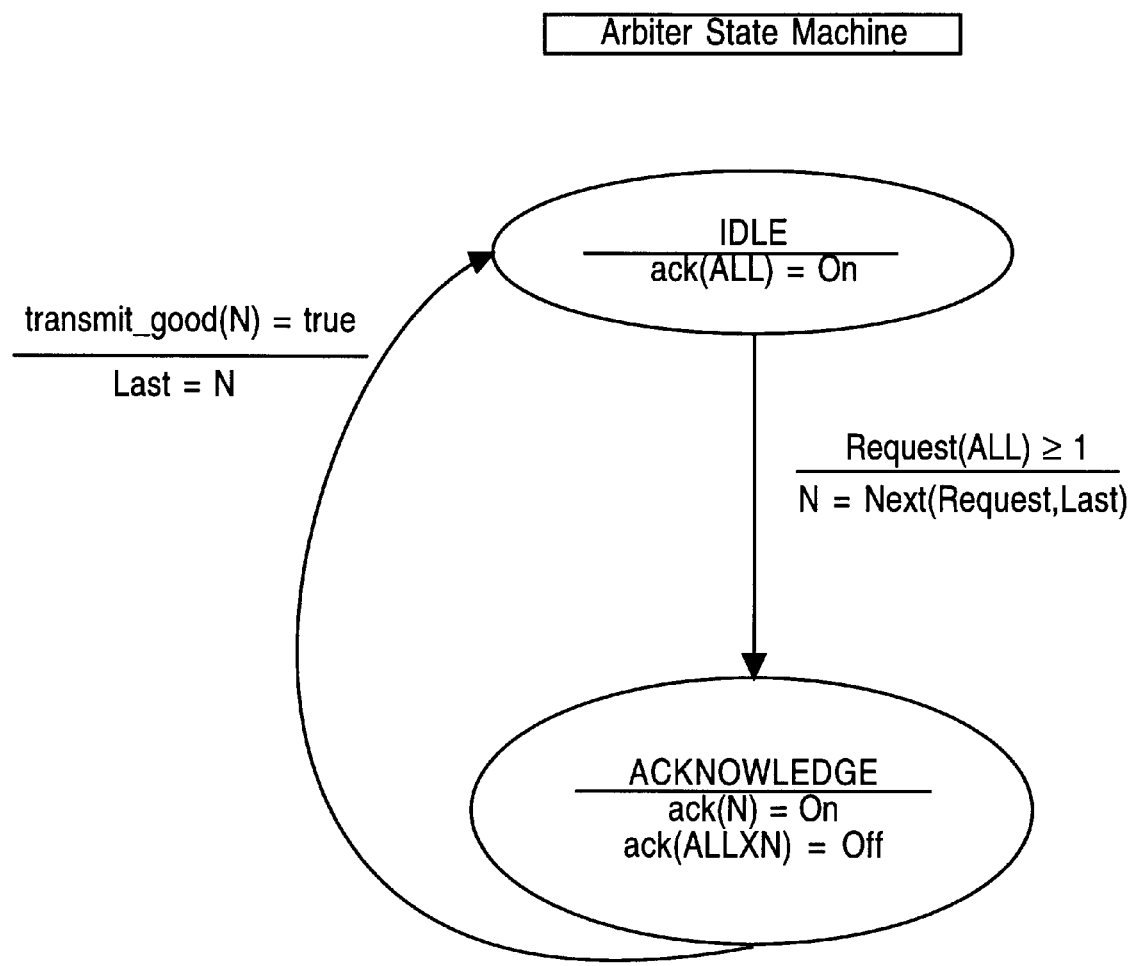
FIG. 9 is a state diagram of an ARBITER in one embodiment of the invention.

FIG. 9 is a state diagram of an ARBITER such as the one shown in FIG. 4. Referring to FIG. 9, in the IDLE state ACK signals are turned on for all the ports in the network to allow them to transmit. If there are one or more REQ signals from ports, then a port N is selected according to a transmission schedule and the arbiter transitions to the ACKNOWL-EDGE state. In this particular embodiment of the invention, the transmission schedule is determined by a Next function based upon a round robin policy and the last port for which an ACK signal was turned on. In ACKNOWLEDGE state, an ACK signal is turned on for port N to allow the port to transmit and ACK signals for all the other ports are turned off. If the transmission from port N is successful (this information can be provided to the ARBITER by the REPEATER CORE as shown in FIG. 4), the arbiter transitions back to IDLE state.

The end stations are able to send at least two different idle symbols to indicate either that their transmission buffers are empty or that they have a pending transmission due to a defer. The latter symbol is called a request-to-transmit or REQ signal. However, it will be appreciated by one skilled in the art that more idle symbols may be added to support various priority levels.

Once a collision occurs, the repeater defers all transmissions from end stations except for the one from the station scheduled to transmit first. All ports involved in the collision, and maybe more, will receive a request-to-transmit indication from end stations having frames to transmit. The multi-port-repeater uses the request-to-transmit indication to schedule or arbitrate the order of transmission and sends a non-defer indication to the next scheduled port.

An end station having a frame involved in the collision waits for a non-defer indication on the channel and retransmits the frame after an agreed time gap (this can vary and be different each time a collision occurs). Otherwise, if a next frame is available, the end stations waits for a non-defer indication on the channel and transmits the next frame after an Inter-Frame-Gap. When a non-deferred port transmission is received by the repeater, it is relayed to all other ports. The repeater then examines again the request status of the ports to schedule the next port or station to transmit and defer all other ports. This process continues until all request-to-transmit indications from end stations have been processed. The multi-port-repeater then can switch back to a mode where it sends non-defer signals to more than one port and allows them to contend for the channel.

Figure 6:
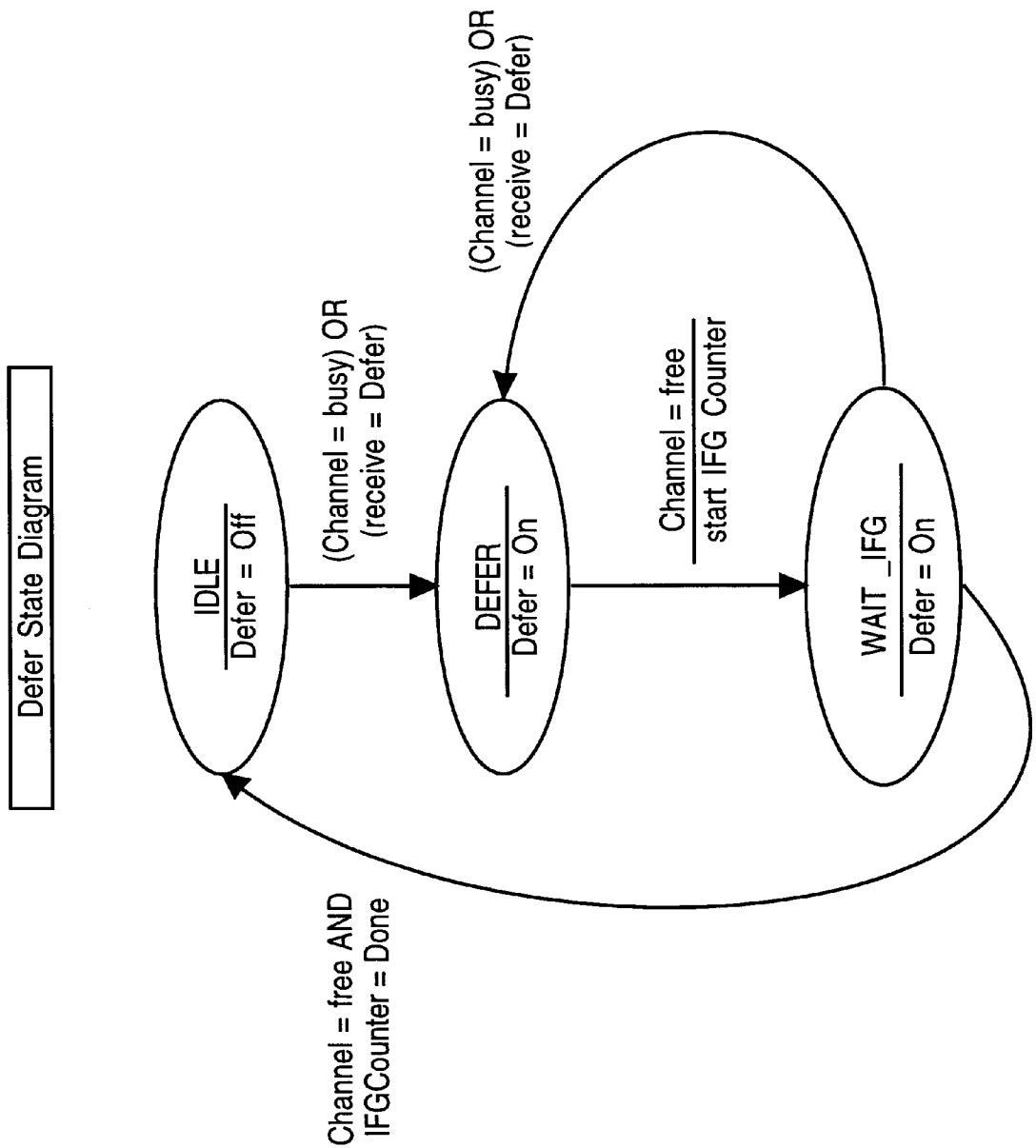
FIG. 6 is a defer state diagram for end stations that can be used in one embodiment of the collision control scheme.

FIG. 6 is a defer state diagram for end stations that can be used in one embodiment of the collision control scheme. Referring to FIG. 6, an end station transitions to a DEFER state when the channel is busy or a DEFER signal is received, and sets a local Defer variable to indicate that defer is on. In the DEFER state, end stations wait until the channel becomes free and transitions to WAIT_IFG state where it waits for an Inter-Frame-Gap. After waiting for an Inter-Frame-Gap, channel status is checked again. If the channel is free, end the station goes to an IDLE state where it resets the Defer variable and is free to transmit a frame. However if the channel becomes busy or a DEFER signal is received at any time, the end station transitions back to the DEFER state.

Figure 7:
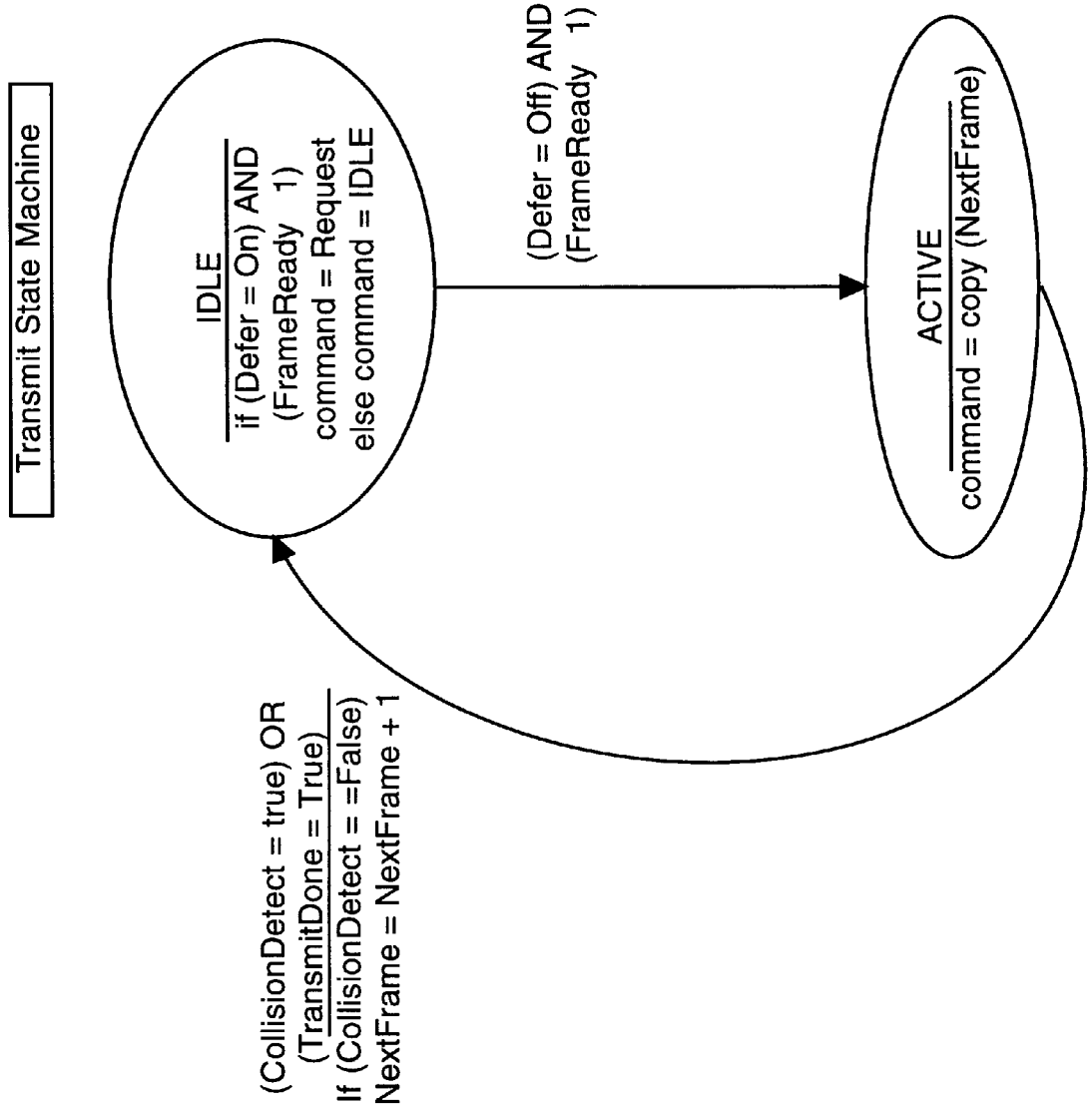
FIG. 7 is a transmit state diagram for end stations in one embodiment of the collision control scheme.

In the transmit diagram of FIG. 7, an end station in an IDLE state sends a REQ signal to the repeater to indicate that it has a deferred frame to transmit when the Defer variable is on and it has a frame to send. The end station transitions to an ACTIVE state when the Defer variable turns off and it has a frame to send. In the ACTIVE state, the end station can transmit a frame successfully or detect a collision. In either case, ACTIVE state transitions back to the IDLE state, and advances the next frame pointer by one if a CollisionDetect variable is false, i.e. if the transmission was successful, such that the next transmission will be the next frame in a local transmission queue. In the ACTIVE state, the CollisionDetect variable is set true when a frame is received by the end station from the channel.

Figure 8:
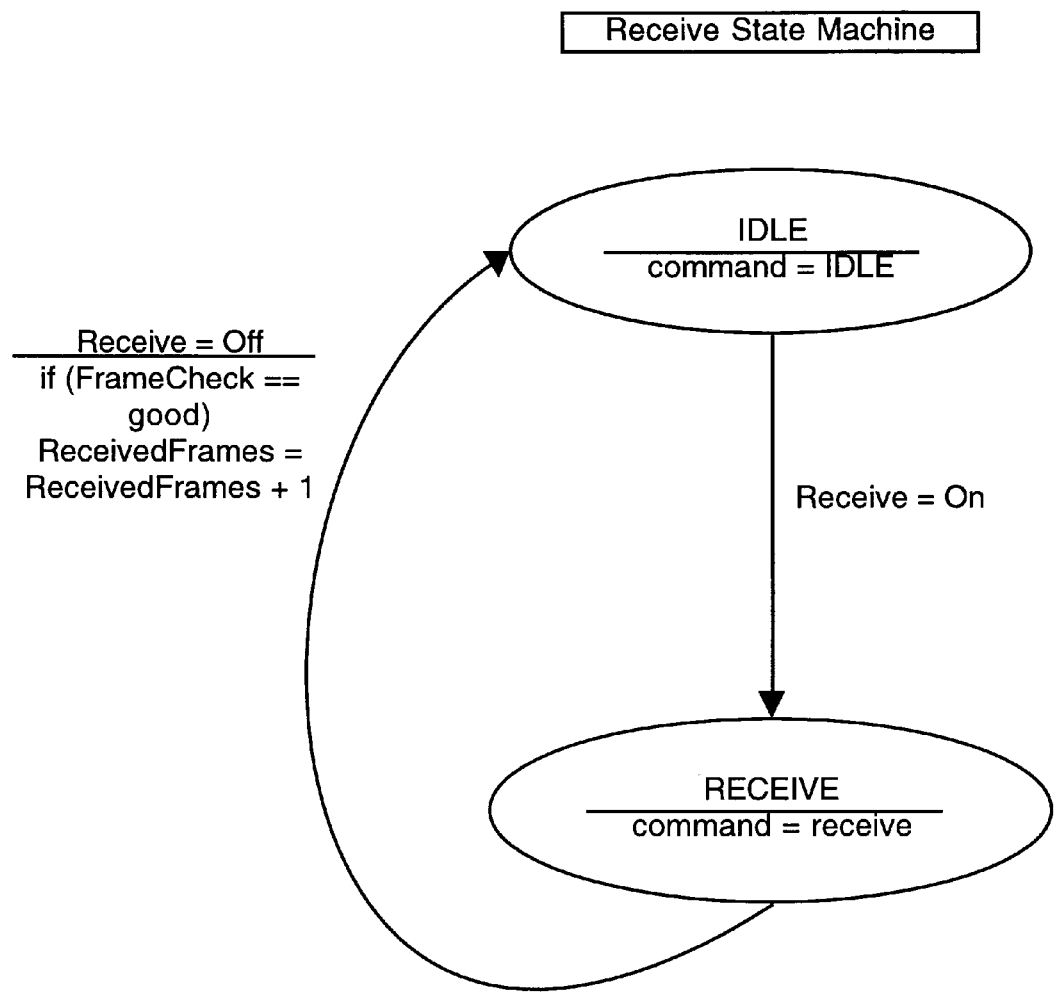
FIG. 8 is a state diagram for an end station receiving frames in one embodiment of the invention.

FIG. 8 is a state diagram for an end station receiving frames in one embodiment of the invention. Referring to FIG. 8, when a frame is received and a local Receive variable is set, the end station transitions from the IDLE state to a RECEIVE state. In the RECEIVE state, when the Receive variable is reset and if the received frame is a valid frame with no transmission errors, then the ReceivedFrames variable is advanced by one.

When the end station architecure of FIG. 14 is used in this particular embodiment, the defer state diagram of FIG. 6 and the transmit state diagram of FIG. 7 can be used to implement the DEFER/TRANSMIT CONTROL block of FIG. 14. Also, the receive state diagram of FIG. 8 can be used to implement the RECEIVE CONTROL block of FIG. 14.

It will be appreciated by one skilled in the art that other collision resolving algorithms may be combined with the collision control method described above. For example, after a collision, the repeater may send a non-defer signal to more than one port and let them resolve the collision by themselves (picking random gaps between frames for example). In still another embodiment of the collision control scheme, a suitable arbitration method can be used to arbitrate among ready-to-transmit ports when some ports are allowed to ignore the defer signal.

It is also possible to use a simple request-acknowledge handshake protocol between a repeater and end stations to prevent collisions, although this might lead to lower network efficiency.

Transmission defer methods can be chosen independent of the collision control method described above. For example, a dummy transmission frame (JAM) can be sent to a port, causing the port to stop transmitting. A predefined carrier extension symbol can be used. Two idle symbols, one as a Defer-idle symbol and the second as a Non-defer-idle symbol can be used. A single symbol that signals Transmit-now can also be sent to end-stations.

Figure 10:
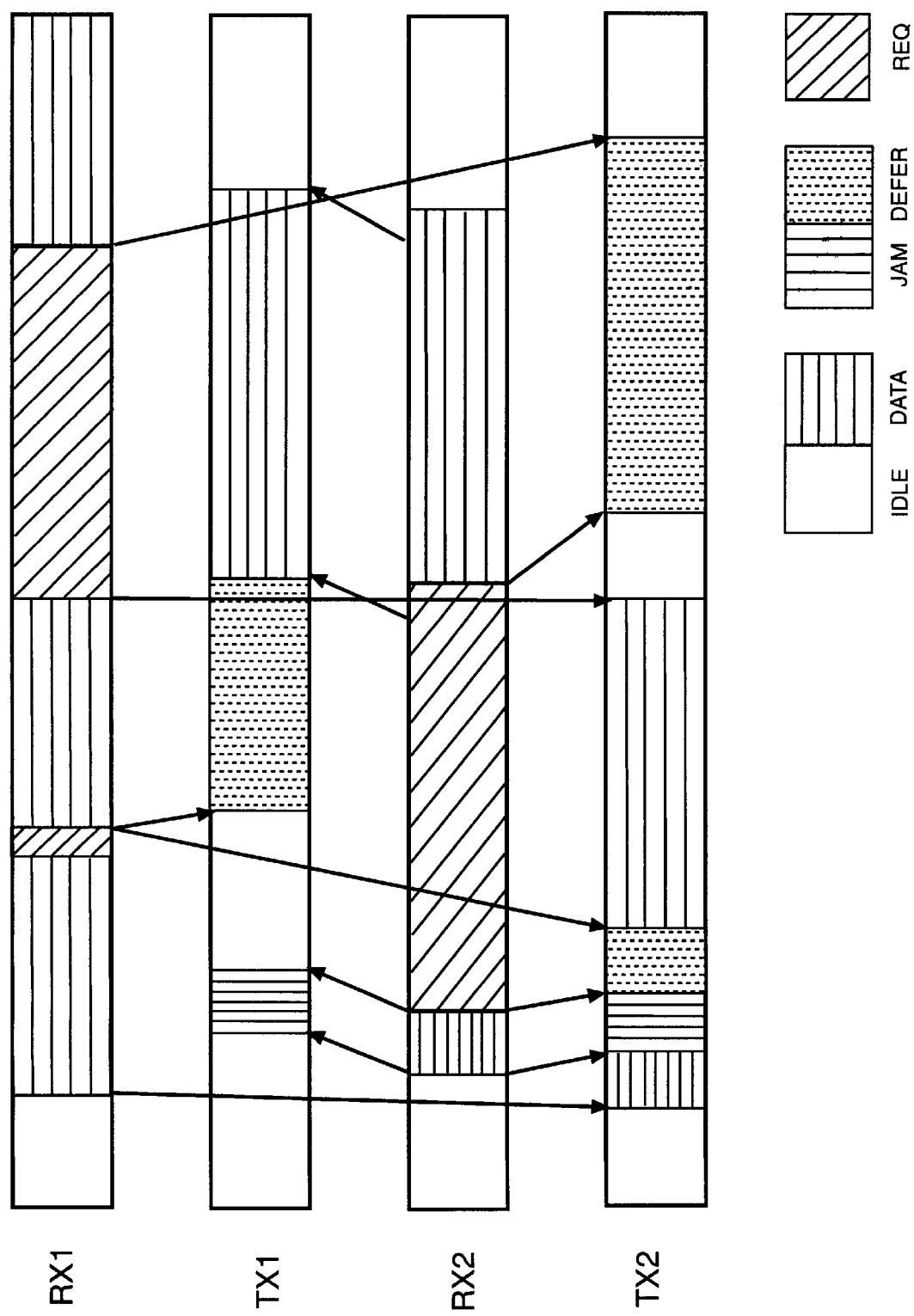
FIG. 10 illustrates an example of a collision control scheme using defer-idle symbols and round robin arbitration.

FIG. 10 illustrates an example of a collision control scheme using a defer-idle symbol and round robin arbitration. In FIG. 10, the repeater receives incoming data from station 1 through port 1. The repeater then relays the received data to stations, 2, 3, . . . , N. However, station 2, not knowing that station 1 already has started transmission, transmits its own frames to the repeater. The repeater then receives incoming data through port 2 and thus detects the collision of data from ports 1 and 2.

Referring to FIG. 10, upon detecting the collision, the repeater sends JAM frames to stations 1 and 2 to cause them to stop transmissions followed by a DEFER signal to station 2 to inhibit it from further transmission. After receiving the JAM signal, stations 1 and 2 send a REQ signal to the repeater to request permission for retransmission and station 1 retransmits its data, which is received successfully and broadcast by the repeater. The repeater then sends a DEFER signal to station 1 to prevent it from further transmissions. As station 2 is the next scheduled station for transmission according to round robin arbitration, it successfully acquires the channel and completes its transmission, which is relayed to other stations by the repeater.

Meanwhile, station 1 sends another REQ signal to the repeater for permission to transmit as can be seen by the second REQ in the RX1 port of the repeater in FIG. 10. After the data transmission on TX1 is complete, station 1 starts transmission.

As can be seen from FIG. 10, fairness can be improved in the invention by scheduling all stations that are involved in a collision in a round robin fashion or using any other fair scheduling algorithm. The improved fairness, combined with zero transmission delay, allows deterministic estimation of transmission delay for end stations.

Also a priority policy can be combined with the collision control scheme to provide faster service to frames with tight delay requirements, such as real time video frames. In this case, priority information is included in a REQ symbol. In addition, network performance is improved due to collision control based on a fair arbitration algorithm as discussed in the previous section.

In an alternate embodiment of the invention, when in collision control mode, the repeater may send information to end stations in addition to a NON-DEFER signal to indicate that the network is in a synchronized mode and that it is therefore not necessary to bring the frame size up to the minimum size using padding or carrier extension. This improves the bandwidth utilization for larger network diameters.

EFFICIENT COLLISION METHOD

The deterministic collision recovery scheme and the collision control scheme described above help overcome prior art disadvantages of fairness, predictability and bandwidth usage. An alternate embodiment, referred to here as a efficient collision method, can be used to increase the network diameter. In this embodiment, an assumption is made that the first frame received by the multi-port repeater is considered to be a good frame and is transmitted to all other ports. The multi-port repeater ignores all other frames received later from other ports. End stations consider all received frames to be good frames and respond to a collision only with an attempt to retransmit any frame involved in the collision.

In this embodiment, end stations contain logic to transmit frames when the channel is not-deferred, and to retransmit if a frame was received during the transmission time. Receiving a carrier is used to defer transmission. All frames received are processed as good frames regardless of collision detection. The end station architecture such as shown in FIG. 14 can also be used in this embodiment.

A multi-port repeater contains logic to monitor reception, to broadcast the first frame received to all other ports, and to ignore all other receptions until all ports are idle again. If more than one frame is received simultaneously the repeater picks one of them arbitrarily as the first frame.

Figure 11:
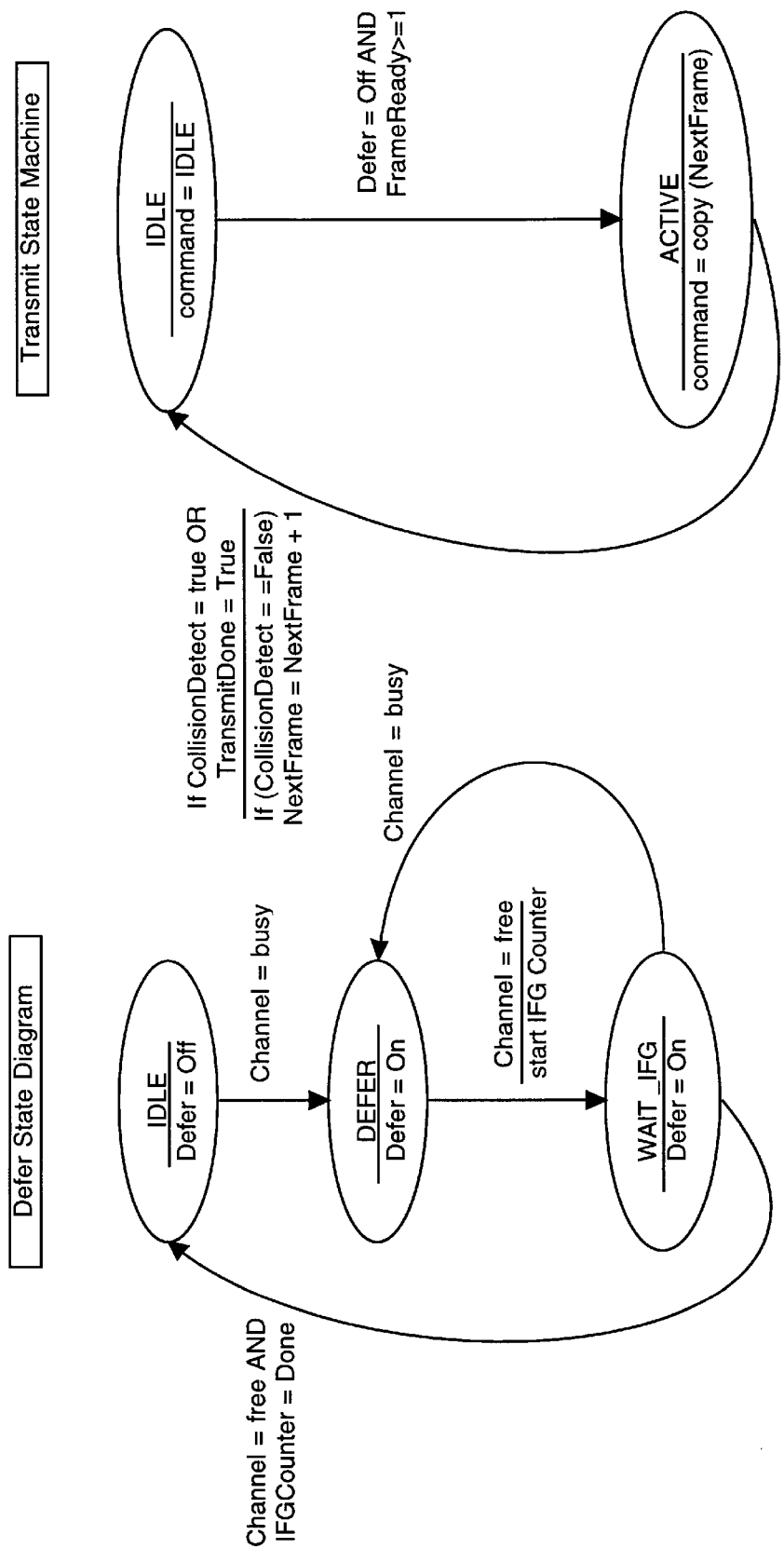
FIG. 11 shows defer and transmit state diagrams for end stations in one embodiment of the efficient collision method.

FIG. 11 shows defer and transmit state diagrams for end stations in one embodiment of the efficient collision method. Referring to FIG. 11, in the defer diagram, the IDLE state transitions to the DEFER state when the channel is busy and the end station sets a local defer variable to indicate that defer is on. In the DEFER state, an end station waits until the channel becomes free and transitions to the WAIT_IFG state where it waits for Inter-Frame-Gap. After waiting for Inter-Frame-Gap, channel status is checked again. If the channel is free, the end station goes to the IDLE state where it is free to transmit a frame. However, if the channel becomes busy at any time, the end station transitions back to the DEFER state.

Referring to FIG. 11, in the transmit diagram, an end station in the IDLE state transitions to the ACTIVE state when the defer variable is off and the end station has a frame to send. In the ACTIVE state, the end station can transmit a frame successfully or detect a collision. In either case, the ACTIVE state transitions back to the IDLE state, and advances the next frame pointer by one if CollisionDetect variable is false, i.e. if the transmission was successful, such that the next transmission will be the next frame in a local transmission queue. In the ACTIVE state, the CollisionDetect variable is set true when a frame is received by an end station from the channel.

The receive state diagram such as shown in FIG. 8 can be used for end stations receiving frames in this particular embodiment of the invention.

When the end station architecure of FIG. 14 is used in this particular embodiment, the defer and transmit state diagrams of FIG. 11 and the receive state diagram of FIG. 8 can be used to implement the DEFER/TRANSMIT CONTROL block and the RECEIVE CONTROL block of FIG. 14, respectively.

Figure 12:
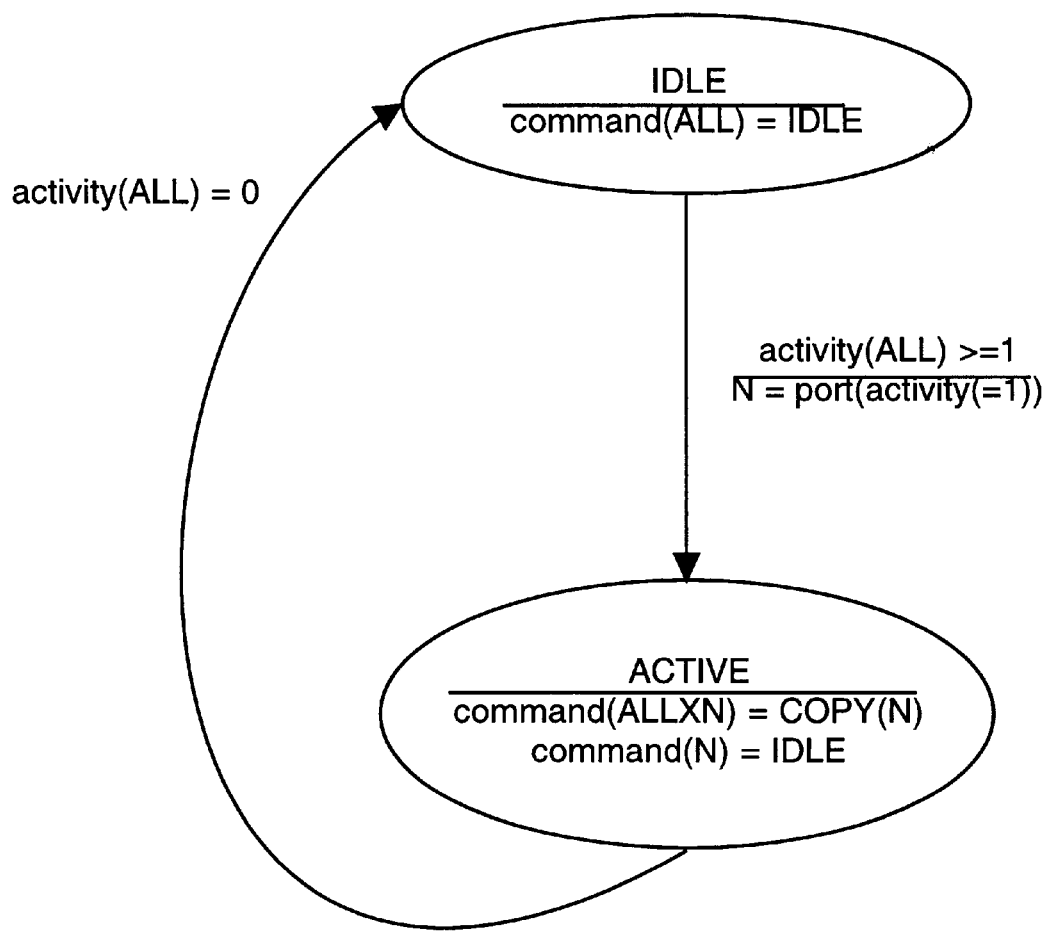
FIG. 12 is a state diagram of the multi-port repeater in one embodiment of the invention.

FIG. 12 is a state diagram of multi-port repeater in one embodiment of the invention. Referring to FIG. 12, in the IDLE state all ports are checked for any activity. If there is any activity in one or more ports, then an active port is selected and the repeater transitions to the ACTIVE state. N is assigned with the number of the port that starts to transmit a frame and causes the repeater to exit the IDLE state. In the ACTIVE state, the received frame from port N is broadcast to all other ports except port N. The repeater continues to receive and broadcast until all ports become silent, at which point it transitions back to IDLE state.

Figure 13:
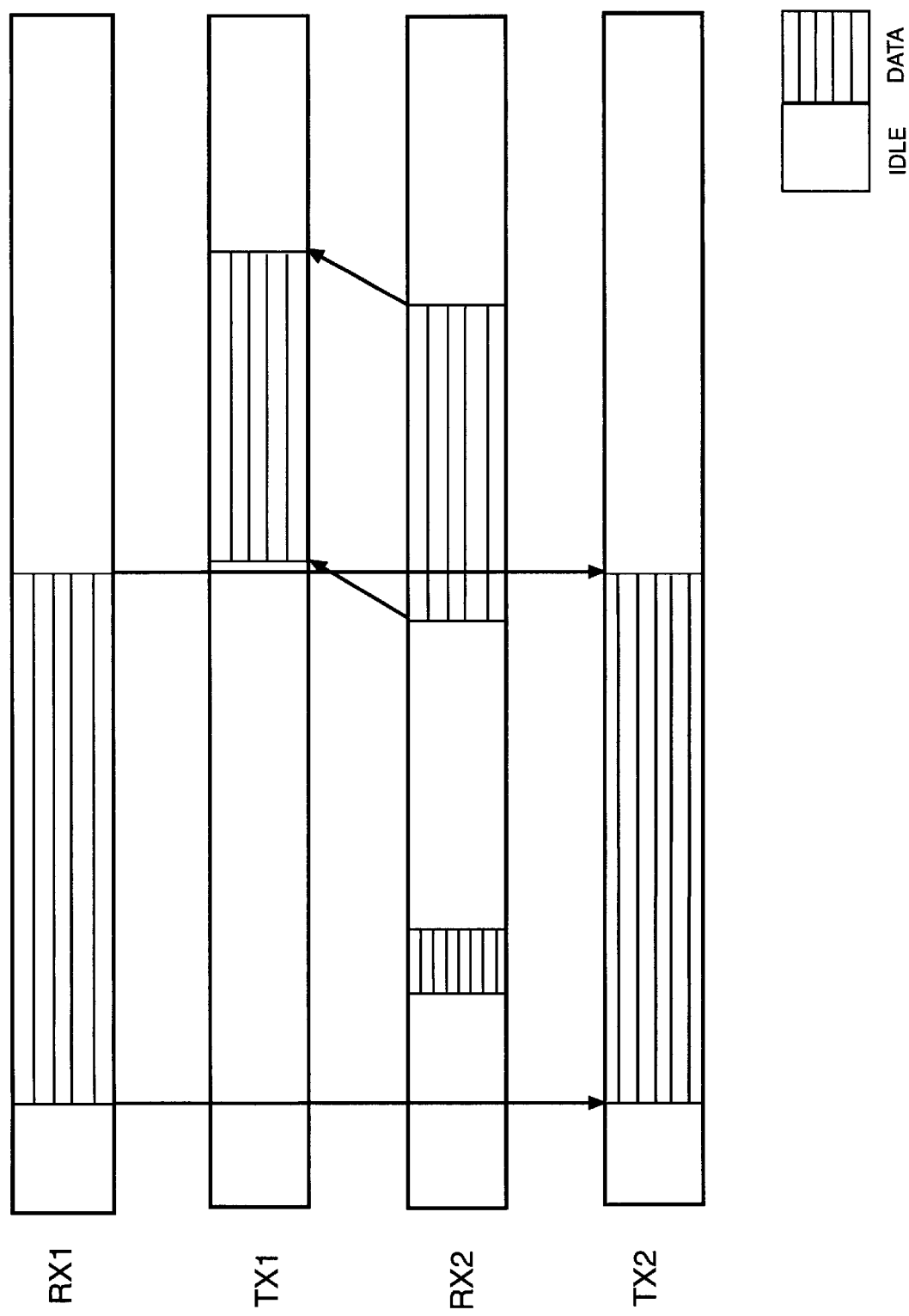
FIG. 13 describes a transmission and reception process between two ports in the efficient collision scheme of the invention.

FIG. 13 describes a transmission and reception process between two ports in one embodiment of the efficient collision scheme. In FIG. 13, station 1 transmits a frame, which is received by the repeater at port 1 (RX1). Upon receiving the frame, the repeater immediately relays it to station 2 through port 2 (TX2). However, station 2, without knowing that station 1 has already begun transmission, starts to transmit a frame, which is received at the repeater port 2 (RX2).

Station 2 then learns that its own transmission was not completed by detecting the incoming transmission which originated from station 1, and prepares to retransmit the frame. However, station 1 does not have to retransmit since during the transmission it did not receive an incoming transmission and thus learns that its transmission has been completed.

The efficient collision control schemed described above cuts the slot time parameter by approximately half, since only one frame is being broadcast and there is no need to consider the round-trip delay: only the end-to-end delay is considered. However, each branch of the repeater needs to have at most a half slot time delay to ensure that the last reception that the repeater receives after a collision will be from the winning port. Thus, the new slot time is the one-direction longest possible delay of one branch of the repeater multiplied by two. Hidden delays such as start of receive to end of transmit should also be considered.

The reduced slot time of the efficient collision scheme allows increasing the network diameter, thereby permitting network expansion and accommodation of user base growth without requiring excessive investment in hardware or network infrastructure.

The slot-time can be further enhanced to meet system requirements by applying the following technique: A frame is defined also as an "Aggressive Request". The first received frame, after being broadcast to the other ports is defined as an "Negative Acknowledge" to all ports that will start a transmission in the Request/Acknowledge window. A change from idle to defer or a special control or idle or symbol is defined as a "Positive Acknowledge". An "End of Batch" Symbol may be defined to support a batch of more than one frame transmission by a collision winning station. When the repeater receives the first frame from port X, the repeater broadcasts the frame from port X to all other ports. The first frame serves as a negative acknowledge so that even if any station starts a transmission before receiving the negative acknowledge frame or starts a batch transmission, it can learn that it needs to retransmit.

The repeater also sends a "Positive Acknowledge" control signal to port X to acknowledge that data has been successfully received and to defer further transmission from port X. A port that transmits a frame and, during or after the transmission, receives a frame from port X and does not receive "Positive Acknowledge" signal needs to retransmit the frame (or multiple frames if it already finished transmitting more than one frame from a Batch) since those frames are not being acknowledged and the repeater has probably received a first frame other than transmitting ports frame.

If batch transmission is supported, the repeater sends defer symbols between frames received from port X until an end-of-batch signal is received. After receiving End-of-Frame or End-of-Batch signals from port X, the repeater sends non-defer signals to all ports to allow them to contend for the channel.

In the efficient collision scheme, however, a certain degree of unfairness can be created since the first frame always has priority and wins. However, any suitable arbitration or scheduling algorithm can be used to compensate for this effect. For example, a round robin policy can be combined with the efficient collision scheme to synchronize retransmission of all other ports involved in a collision event and to improve fairness in the transmission priority, as described in the collision recovery section.

One way to improve fairness is to use the Inter Frame Gap variable. For example, the default Inter Frame Gap can be made bigger than the roundtrip delay. Further, if only the end-stations that collided are allowed to change this gap to the minimum value possible when retransmitting, ports that collided wait less time than the ports that had successful transmission. After a collision, only the ports that suffered a collision may participate in the next transmission round in this particular alternate embodiment.

Alternatively, when the repeater receives the first frame from one of the ports and starts to broadcast that frame to all other ports, it can also send a defer signal to the transmitting port. If a collision occurs, the repeater continues to send defer signals until the first non-collision event happens. Thus, after a second consecutive collision two ports will be deferred, and so-on.

It will be appreciated by one skilled in the art that the efficient collision scheme has no limitations with respect to transmission arbitration or scheduling algorithm and thus may be combined with any other suitable transmission synchronization algorithm. For example, the efficient collision scheme may be combined with the existing IEEE CSMA/CD Ethernet standards.

If the efficient collision scheme is combined with the IEEE CSMA/CD Ethernet standards, the MAC layer will be different in the backoff computing algorithm, since in the efficient collision approach the delay is always zero while in the IEEE 802.3 Ethernet algorithm, stations should wait a random number of slot times, depending upon the number of retries. Thus, there is a certain degree of randomness when the efficient collision is combined with the IEEE 802.3 Ethernet standards, and a deterministic transmission delay is not guaranteed.

It is also possible to combine the efficient collision scheme and the collision control scheme, thereby providing deterministic transmission delay with half the standard slot time. However, the slot time is now the end-to-end delay instead of the round trip delay. Thus, sending a defer signal to the first port from which a frame is received when a collision occurs will be too late to stop the end station's transmission if the frame is short and that end station has another frame to transmit immediately after the first frame. Thus the repeater should be prepared for another collision event even though it sends a defer signal to all other ports.

This situation can be alleviated by sending a defer signal to the transmitting port immediately after receiving the beginning of the frame and switching back to the non-defer mode after a slot time of transmission without a collision. If a collision still occurs, the stations have to wait for the arbitration or scheduling logic decision.

Thus, methods and apparatus for collision control for star topology, collision-based networks have been described in conjunction with one or more specific embodiments. It will be appreciated by one skilled in the art that the collision recovery, the collision control, and the efficient collision schemes of the invention can be applied separately independent of the other schemes, or in combination therewith, to control collisions in CSMA LANs. The invention is defined by the claims and their full scope of equivalents.

It is understood that particular embodiments described herein should not limit the present invention thereby. It will also be appreciated by those skilled in the art that changes in various details may be made without departing from the invention defined in the appended claims.

I claim:

1. A method of collision control in a CSMA (Carrier Sense Multiple Access) local area network comprising a plurality of end stations and a multi-port repeater comprising a plurality of ports, each of said plurality of ports coupled to at least one of said plurality of end stations, said method comprising the steps of:

the repeater selecting a frame to relay and identifying a first port through which said frame was received;

the repeater relaying said selected frame to ports other than said first port;

the repeater discarding all received frames except the selected frame during said relay;

the repeater sending a defer signal to said first port instructing said at least one end station coupled to said first port to defer transmissions until the repeater receives fewer than two frames during a slot time.

2. The method of collision control of claim 1 wherein said selected frame is a first received frame during a slot time.

3. The method of collision control of claim 1 further comprising the step of end stations whose frames were discarded by the repeater decreasing the amount of an inter-frame gap.

4. The method of collision control of claim 1 further comprising the steps of:

the repeater sending a positive acknowledge signal to said first port;

the repeater sending a negative acknowledge signal to end stations whose frames were discarded by the repeater.

* * * * *